Jan. 3, 1933.   G. F. HARTER   1,892,700
ELECTRICAL CONTROL SYSTEM
Filed Feb. 10, 1928
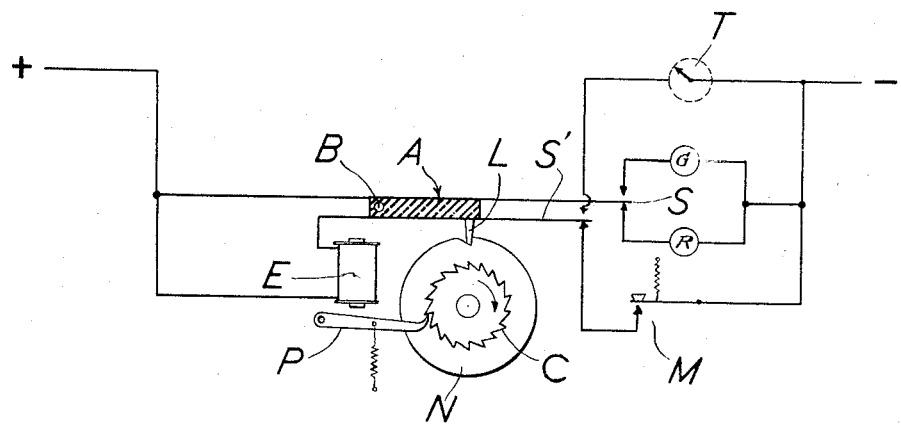
Inventor:
George F. Harter
by Roberts Cushman & Woodberry
Attys.

Patented Jan. 3, 1933

1,892,700

UNITED STATES PATENT OFFICE

GEORGE F. HARTER, OF SPRINGFIELD, MASSACHUSETTS, ASSIGNOR TO THE STANDARD ELECTRIC TIME COMPANY, OF SPRINGFIELD, MASSACHUSETTS, A CORPORATION OF CONNECTICUT

ELECTRICAL CONTROL SYSTEM

Application filed February 10, 1928. Serial No. 253,391.

The object of this invention is to provide an electrical control system which is simple and inexpensive to construct and install and which is reliable and durable in operation. While the system may be employed to control any desired number or kinds of circuit, a typical use consists in operating a plurality of lights or sound signals in predetermined time relationship.

The invention comprises a plurality of operating circuits together with motive means for collectively closing the circuits, a starter for starting the motive means, and mechanism for automatically stopping said means at the end of a predetermined period of time. The motive means preferably comprises a rotor turning in the same direction at each operation, in contradistinction to a rotor which is turned backwards to wind a spring and then permitted to return to its initial position. More specifically the invention comprises switching means actuated by a controller which is driven by a motor, preferably in the form of an electromagnetic step motor, with a branched control circuit for the motor, one branch containing a time switch and the other branch containing an auxiliary switch, together with a two-way switch controlled by the controller, the two-way switch normally connecting the auxiliary switch to the motor for starting the motor and then switching the motor to the time switch after the motor has started, the controller having means for restoring the two-way switch to normal position after a predetermined time, whereby momentary closing of the auxiliary or starting switch causes the rotor to initiate a cycle of signals or other operations which cycle is terminated automatically by the controller at the end of the cycle.

The simple application of the invention shown diagrammatically for the purpose of illustration comprises a branched circuit containing signals G and R respectively (which may be green and red lights for example) either of which may be connected in circuit with a suitable source of power by means of the switch S, an electromagnetic motor E, a branched actuating circuit for the motor, one branch containing the normally open manually operated switch M and the other branch containing the time switch T which closes circuit at regular intervals, a two-way switch S' for connecting either branch of the aforesaid circuits to the motor E, a controller in the form of a rotor N having a notch in its periphery to receive a lug L on the switch assembly A, a ratchet wheel C interconnected with the rotor and a pawl P for actuating the ratchet wheel C in response to recurrent energizations of the magnet E.

With the parts in the normal position as shown in the figure, circuit through R is closed and the circuit through G is open, and the circuit through the magnet E is closed at S' but open at switch M. To initiate a cycle of signals switch M is closed momentarily to send an impulse of current through magnet E whereupon the rotor N is rotated in the direction of the arrow one step by the pawl and ratchet mechanism, this single step being sufficient to lift the lug L out of the recess in rotor N, thereby swinging the switch assembly A around the pivot B to a position wherein switch S opens circuit R and closes circuit G and switch S' opens circuit through M and closes circuit through T. The switch M may then be released to open circuit, the time clock T then functioning to send impulses to magnet E at the desired frequency. After the rotor N has made one complete revolution the lug L drops back into the recess in the periphery of the rotor, thereby restoring the switch assembly to the original position as shown in the drawing. The shift of the switch S' from the time switch circuit to the normally open circuit containing the manual switch M stops the motor; and the shift of switch S opens circuit G and closes circuit R.

It will of course be evident that the switch assembly A may comprise as many switches as necessary to control the number of circuits involved. It will also be understood that instead of having a single recess in the rotor N a plurality of recesses may be provided to stop the rotor at more frequent intervals.

I claim:

1. An electrical control system comprising a plurality of operating circuits, switching means for closing said circuits in sequence, a rotor for actuating said switching means, the rotor turning only in one direction, an electromagnet for driving said rotor in said direction, a branched control circuit for said electromagnet, one branch containing means for transmitting impulses to said electromagnet at a predetermined rate and the other branch containing an auxiliary switch, and a two-way switch controlled by said rotor for connecting either branch to the electromagnet.

2. An electrical control system comprising a plurality of operating circuits, switching means for closing said circuits, a controller for actuating said switching means, a motor for driving said controller, a branched control circuit for said motor, one branch containing a time switch for transmitting impulses to said electromagnet at a predetermined rate and the other branch containing an auxiliary switch, and a two-way switch controlled by said controller normally connecting said auxiliary switch to the motor for starting the motor and then switching the motor to the time switch after the motor has started, the controller having means for restoring the two-way switch to normal position after a predetermined time.

3. An electrical control system comprising a plurality of signal circuits, a switch for controlling said circuits, a rotor for actuating the switch, an electromagnet for stepping the rotor around, a branched circuit for said electromagnet, one branch containing a manual starting switch and the other branch containing a time switch for transmitting impulses to said electromagnet at a predetermined rate, a two-way switch for connecting either of said branches to the electromagnet, and means associated with the rotor for moving said two-way switch to the time-switch branch when the rotor is started and then back to the starting-switch branch after the rotor has rotated a predetermined degree, whereby momentary closing of the starting switch causes the rotor to initiate a cycle of signals which cycle is terminated automatically.

4. An electrical control system comprising a plurality of operating circuits, separately operable devices controlled by said operating circuits respectively, an actuating circuit, motive means associated with said actuating circuit for closing either operating circuit, a starter associated with said actuating circuit for manually starting said means, and mechanism responsive to a predetermined advance of said means for automatically stopping said means at the end of a predetermined advance movement.

5. An electrical control system comprising a plurality of operating circuits, separately operable devices controlled by said operating circuits respectively, motive means for selectively closing either operating circuit, an actuating circuit, a starter associated with said actuating circuit for manually starting said means, and mechanism responsive to a predetermined advance of said means for automatically stopping said means at the end of a predetermined advance movement.

6. An electrical control system comprising a plurality of operating circuits, separately operable devices controlled by said operating circuits respectively, motive means for selectively closing either operating circuit, said means including a rotor turning in the same direction at each operation, a starter for manually starting said means, and mechanism for automatically stopping said means at the end of a predetermined period of time.

7. An electrical control system comprising a plurality of operating circuits, motive means for selectively closing either operating circuit, said means including a rotor turning in the same direction at each operation, a starter for manually starting said means, and mechanism responsive to a predetermined advance of said means for automatically stopping said means at the end of a predetermined advance movement.

8. An electrical control system comprising a plurality of operating circuits, switching means for selectively closing said circuits in predetermined time relationship, a controller for controlling the movement of said switching means to each circuit-closing position, means for driving said controller at a predetermined rate, a manual starter for setting said driving means into operation, and means responsive to a predetermined advance of said driving means for automatically stopping the controller.

9. An electrical control system comprising a plurality of operating circuits, switching means for selectively closing said circuits in predetermined time relationship, a controller for controlling the movement of said switching means to each circuit-closing position, means for driving said controller at a predetermined rate, an actuating circuit controlled by said controller and containing a switch for starting the driving means independently of the controller, and means responsive to a predetermined advance of said driving means for automatically stopping the controller.

10. An electrical control system comprising a plurality of operating circuits, separately operable devices controlled by said operating circuits respectively, switching means having two operative positions for selectively closing said circuits in sequence, a rotor for moving said switching means from either of said positions to the other, the rotor turning only in one direction, an electromagnet for driving said rotor in said direction, a circuit for said electromagnet including a switch controlled by the rotor and an auxiliary switch uncontrolled by the rotor.

11. An electrical control system comprising a plurality of operating circuits, switching means having two operative positions for selectively closing said circuits in sequence, a rotor for actuating said switching means from either of said positions to the other, the rotor turning only in one direction, an electromagnet for driving said rotor in said direction, a circuit for said electromagnet including a starting switch and a stopping switch, and means responsive to a predetermined advance of the rotor for automatically opening the stopping switch after the rotor has rotated a predetermined degree.

Signed by me at Springfield, Massachusetts, this 4th day of February, 1928.

GEORGE F. HARTER.